US008271212B2

United States Patent
Sai

(10) Patent No.: US 8,271,212 B2
(45) Date of Patent: Sep. 18, 2012

(54) METHOD FOR ROBUST GAUGING ACCURACY FOR LEVEL GAUGES UNDER MISMATCH AND LARGE OPENING EFFECTS IN STILLPIPES AND RELATED APPARATUS

(75) Inventor: Bin Sai, Zuid Holland (NL)

(73) Assignee: Enraf B.V., Delft (NL)

( * ) Notice: Subject to any disclaimer, the term of this patent is extended or adjusted under 35 U.S.C. 154(b) by 383 days.

(21) Appl. No.: 12/534,651

(22) Filed: Aug. 3, 2009

(65) Prior Publication Data

US 2010/0070207 A1    Mar. 18, 2010

Related U.S. Application Data

(60) Provisional application No. 61/098,170, filed on Sep. 18, 2008.

(51) Int. Cl.
*G01F 23/00* (2006.01)
*H03F 1/26* (2006.01)

(52) U.S. Cl. ............. 702/55; 702/57; 702/103; 702/189

(58) Field of Classification Search ............... 702/55–60, 702/100, 103–106, 182–190
See application file for complete search history.

(56) References Cited

U.S. PATENT DOCUMENTS

| | | | |
|---|---|---|---|
| 3,217,267 A | 11/1965 | Loposer | |
| 3,337,814 A | 8/1967 | Brase et al. | |
| 3,353,104 A | 11/1967 | Loposer | |
| 3,579,281 A | 5/1971 | Kam et al. | |
| 3,789,302 A | 1/1974 | Rearwin et al. | |
| 3,903,482 A | 9/1975 | Pausini et al. | |
| 4,000,476 A | 12/1976 | Walker et al. | |
| 4,024,464 A | 5/1977 | Underhill et al. | |
| 4,027,274 A | 5/1977 | Fukui et al. | |
| 4,068,199 A | 1/1978 | Madoff | |
| 4,072,947 A | 2/1978 | Johnson | |
| 4,114,110 A | 9/1978 | Nossen | |
| 4,361,801 A | 11/1982 | Meyer et al. | |
| 4,451,930 A | 5/1984 | Chapman et al. | |
| 4,510,461 A | 4/1985 | Dickes et al. | |

(Continued)

FOREIGN PATENT DOCUMENTS

DE    296 08 551 U1    7/1996

(Continued)

OTHER PUBLICATIONS

"HERMetic Sensor", Honeywell Enraf, 2007, 5 pages (Continued)

*Primary Examiner* — Phuong Huynh

(57) ABSTRACT

A method includes transmitting wireless signals towards a material in a tank and receiving wireless signals reflected off the material. The method also includes calculating a phase velocity of the wireless signals reflected off the material and identifying a level of the material in the tank using the phase velocity. Calculating the phase velocity of the wireless signals could include identifying a plurality of linearly-spaced frequencies and performing linear interpolation using the data identifying the wireless signals to identify data points at the linearly-spaced frequencies. The identification of the data points at the linearly-spaced frequencies could represent the only interpolation operation performed during the calculation of the phase velocity and the identification of the level of the material. Moreover, a mismatch could exist between an inner diameter of a stillpipe through which the wireless signals are transmitted and a diameter of an antenna used to receive the wireless signals.

17 Claims, 5 Drawing Sheets

U.S. PATENT DOCUMENTS

| | | | |
|---|---|---|---|
| 4,516,084 A | 5/1985 | Crowley |
| 4,567,448 A | 1/1986 | Ikeda |
| 4,675,617 A | 6/1987 | Martin |
| 4,691,176 A | 9/1987 | Hsiung et al. |
| 4,800,341 A | 1/1989 | Johnson |
| 4,823,399 A | 4/1989 | George |
| 4,868,494 A | 9/1989 | Ryder et al. |
| 4,928,525 A | 5/1990 | Aderholt et al. |
| 4,958,228 A | 9/1990 | Kutsuki |
| 4,972,160 A | 11/1990 | Sylvain |
| 5,027,526 A | 7/1991 | Crane |
| 5,034,703 A | 7/1991 | Schumacher |
| 5,036,291 A | 7/1991 | Marz |
| 5,052,028 A | 9/1991 | Zwack |
| 5,210,539 A | 5/1993 | Voyce |
| 5,270,669 A | 12/1993 | Jokura |
| 5,400,253 A | 3/1995 | O'Connor |
| 5,406,842 A | 4/1995 | Locke |
| 5,428,361 A | 6/1995 | Hightower et al. |
| 5,442,359 A | 8/1995 | Rubin |
| 5,446,416 A | 8/1995 | Lin et al. |
| 5,572,167 A | 11/1996 | Alder et al. |
| 5,708,424 A | 1/1998 | Orlando et al. |
| 5,734,302 A | 3/1998 | Teng et al. |
| 5,773,913 A | 6/1998 | Casselden |
| 5,774,089 A | 6/1998 | Bamler et al. |
| 5,923,284 A | 7/1999 | Artis et al. |
| 5,994,905 A | 11/1999 | Franchville |
| 6,107,957 A | 8/2000 | Cramer et al. |
| 6,114,987 A | 9/2000 | Bjornholt |
| 6,374,187 B1 | 4/2002 | Knight et al. |
| 6,404,288 B1 | 6/2002 | Bietz Achim et al. |
| 6,621,449 B1 | 9/2003 | Kunert |
| 6,629,458 B1 | 10/2003 | Westerling et al. |
| 6,636,575 B1 | 10/2003 | Ott |
| 6,662,649 B1 | 12/2003 | Knight et al. |
| 6,671,500 B2 | 12/2003 | Damgaard et al. |
| 6,762,634 B1 | 7/2004 | Hattori |
| 6,774,732 B1 | 8/2004 | Harnishfeger et al. |
| 6,876,621 B2 | 4/2005 | Ohuchida et al. |
| 7,135,870 B2 | 11/2006 | Mohajer et al. |
| 7,891,229 B2 | 2/2011 | Sai |
| 2002/0101373 A1* | 8/2002 | Arndt et al. ............... 342/124 |
| 2002/0183030 A1 | 12/2002 | Damgaard et al. |
| 2003/0167839 A1 | 9/2003 | Burger et al. |
| 2004/0196177 A1 | 10/2004 | Billington et al. |
| 2004/0207477 A1 | 10/2004 | Gumm |
| 2005/0052314 A1* | 3/2005 | Spanke et al. ............... 342/124 |
| 2005/0190098 A1 | 9/2005 | Bridgelall et al. |
| 2005/0206555 A1 | 9/2005 | Bridgelall et al. |
| 2006/0044145 A1 | 3/2006 | Akerstrom et al. |
| 2006/0044147 A1 | 3/2006 | Knox et al. |
| 2006/0143000 A1 | 6/2006 | Setoguchi |
| 2007/0109177 A1 | 5/2007 | Baath et al. |
| 2010/0002912 A1 | 1/2010 | Solinsky |
| 2010/0037673 A1 | 2/2010 | Wicht et al. |
| 2010/0066589 A1 | 3/2010 | Sai et al. |
| 2010/0070208 A1 | 3/2010 | Sai |
| 2010/0070209 A1 | 3/2010 | Sai |
| 2010/0175470 A1 | 7/2010 | Schrier et al. |
| 2010/0241369 A1 | 9/2010 | Wicht et al. |
| 2011/0163910 A1 | 7/2011 | Sai |

FOREIGN PATENT DOCUMENTS

| | | |
|---|---|---|
| DE | 100 40 180 A1 | 4/2002 |
| DE | 10 2004 061449 A1 | 6/2006 |
| DE | 10 2005 019 095 A1 | 10/2006 |
| EP | 0 573 034 A | 12/1993 |
| EP | 0 887 658 A | 12/1998 |
| GB | 2 064 188 A | 6/1981 |
| GB | 2 342 995 A | 4/2000 |
| NL | 1032192 | 7/2006 |
| WO | WO 98/12514 A1 | 3/1998 |
| WO | WO 2004/018978 A1 | 3/2004 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/104967 A2 | 9/2008 |
| WO | WO 2010/019427 A2 | 2/2010 |

OTHER PUBLICATIONS

"Servo Gauge 854ATG" Product Sheet, Enraf B.V., May 2008, 4 pages.

"Starrett Digitape 25", 1999 and possibly earlier, 4 pages.

European Search Report dated Aug. 17, 2010 in connection with European Patent Application No. EP 10 15 5559.

International Standard, Petroleum and liquid petroleum products-Measurement of level and temperature in storage tanks by automatic methods, Part 3: Measurement of level in pressurized storage tanks (non-refrigerated), 1st Edition, Nov. 15, 2002, 21 pages.

"Level sensor", wikipedia.org, Aug. 2, 2008, 8 pages.

Communication pursuant to Article 94(3) EPC dated Jan. 11, 2010 in connection with European Patent Application No. EP 09169534.

European Search Report dated Dec. 14, 2009 in connection with European Patent Application No. EP 09169534.

Notification of Transmittal of the International Search Report and the Written Opinion of the International Searching Authority, or the Declaration dated Oct. 28, 2008 in connection with PCT Patent Application No. PCT/NL2008/000196.

Bai Sin, et al., "Advanced High Precision Radar Gauge for Industrial Applications", Proceedings of the 2006 CIE International Conference on Radar, vol. 1, Oct. 16, 2006, pp. 463-466.

* cited by examiner

METHOD FOR ROBUST GAUGING ACCURACY FOR LEVEL GAUGES UNDER MISMATCH AND LARGE OPENING EFFECTS IN STILLPIPES AND RELATED APPARATUS

CROSS-REFERENCE TO RELATED APPLICATIONS

This application claims priority under 35 U.S.C. §119(e) to U.S. Provisional Application No. 61/098,170 filed on Sep. 18, 2008, which is hereby incorporated by reference.

TECHNICAL FIELD

This disclosure relates generally to inventory management systems. More specifically, this disclosure relates to a method for robust gauging accuracy for level gauges under mismatch and large opening effects in stillpipes and related apparatus.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials.

Often times, it is necessary or desirable to measure the amount of material stored in a tank. This may be useful, for example, during loading of material into the tank or unloading of material from the tank. As particular examples, "custody transfers" and "weights and measures of oil" often require highly accurate measurements from level gauging instruments installed on the roof of a tank. In bulk storage tanks, an error of one millimeter in a level reading can correspond to several cubic meters of volumetric error. This can result in losses of thousands of dollars for one or more parties.

One approach to monitoring the amount of material in a tank involves the use of radar measurements. In this approach, radar signals are transmitted towards and reflected off the surface of the material in the tank. For bulk storage tank level measurements, this approach often involves one of two measurement techniques: free-space techniques or stillpipe techniques (also referred to as stillingwell or standpipe techniques).

Stillpipe techniques typically involve the transmission of radar signals through a pipe within a tank. The pipe is often referred to as a stillpipe, stillingwell, or standpipe. For convenience, the term "stillpipe" refers collectively to stillpipes, stillingwells, or standpipes. A stillpipe typically includes a number of openings, such as holes or slots, on the stillpipe to allow material to flow into and out of the stillpipe. Because of this, the level of material in the stillpipe is generally equal to the overall level of material in the tank. As a result, the radar signals can be used to estimate the level of material in the stillpipe and therefore in the tank. One problem often encountered using radar transmissions in stillpipes is frequency dispersion. That is, the frequency of radar signals can change or disperse as the radar signals travel through a stillpipe.

One particular type of stillpipe technique involves determining the "group velocity" of radar signals transmitted through a stillpipe and performing multiple interpolations to identify the level of material in the stillpipe. However, this technique does not allow for mismatch between the inner diameter of the stillpipe and the diameter of an antenna used to transmit and receive the radar signals. For example, in applications such as custody transfer and weights and measures, the tolerance of mismatch must often be within one millimeter.

In fact, radar measurements taken using stillpipes are often degraded by the effects of mismatch between stillpipe inner diameter and antenna diameter. It is rather hard to make tens of meters of a pipe with such strict tolerance at a reasonable cost. Among other things, this mismatch typically increases frequency dispersion. This mismatch can also generate unwanted other modes or higher modes of electromagnetic fields, which can result in severe interference in main mode-based measurements and produce inaccuracies in the radar measurements.

In addition, in real-world operations, large stillpipe openings may be needed for viscous material to freely move from outside the stillpipe to inside the stillpipe and vice versa. However, the large openings on the sides of the stillpipes can degrade the accuracy of radar measurements even more. This is because the openings may generate drastic disturbances in electromagnetic fields propagating inside the stillpipes.

One approach to solving this problem involves imposing stringent requirements on the inner diameters of stillpipes. However, this can lead to high manufacturing and installation costs to ensure the accuracy of level radar gauges under the required stillpipe conditions.

SUMMARY

This disclosure provides a method for robust gauging accuracy for level gauges under mismatch and large opening effects in stillpipes and related apparatus.

In a first embodiment, an apparatus includes an interface configured to receive data identifying wireless signals reflected off material in a tank. The apparatus also includes a processing system configured to calculate a phase velocity of the wireless signals reflected off the material using the data and to identify a level of the material in the tank using the phase velocity.

In a second embodiment, a method includes transmitting wireless signals towards a material in a tank and receiving wireless signals reflected off the material. The method also includes calculating a phase velocity of the wireless signals reflected off the material and identifying a level of the material in the tank using the phase velocity.

In a third embodiment, a computer readable medium embodies a computer program. The computer program includes computer readable program code for receiving data identifying wireless signals reflected off material in a tank. The computer program also includes computer readable program code for calculating a phase velocity of the wireless signals reflected off the material using the data. The computer program further includes computer readable program code for identifying a level of the material in the tank using the phase velocity.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
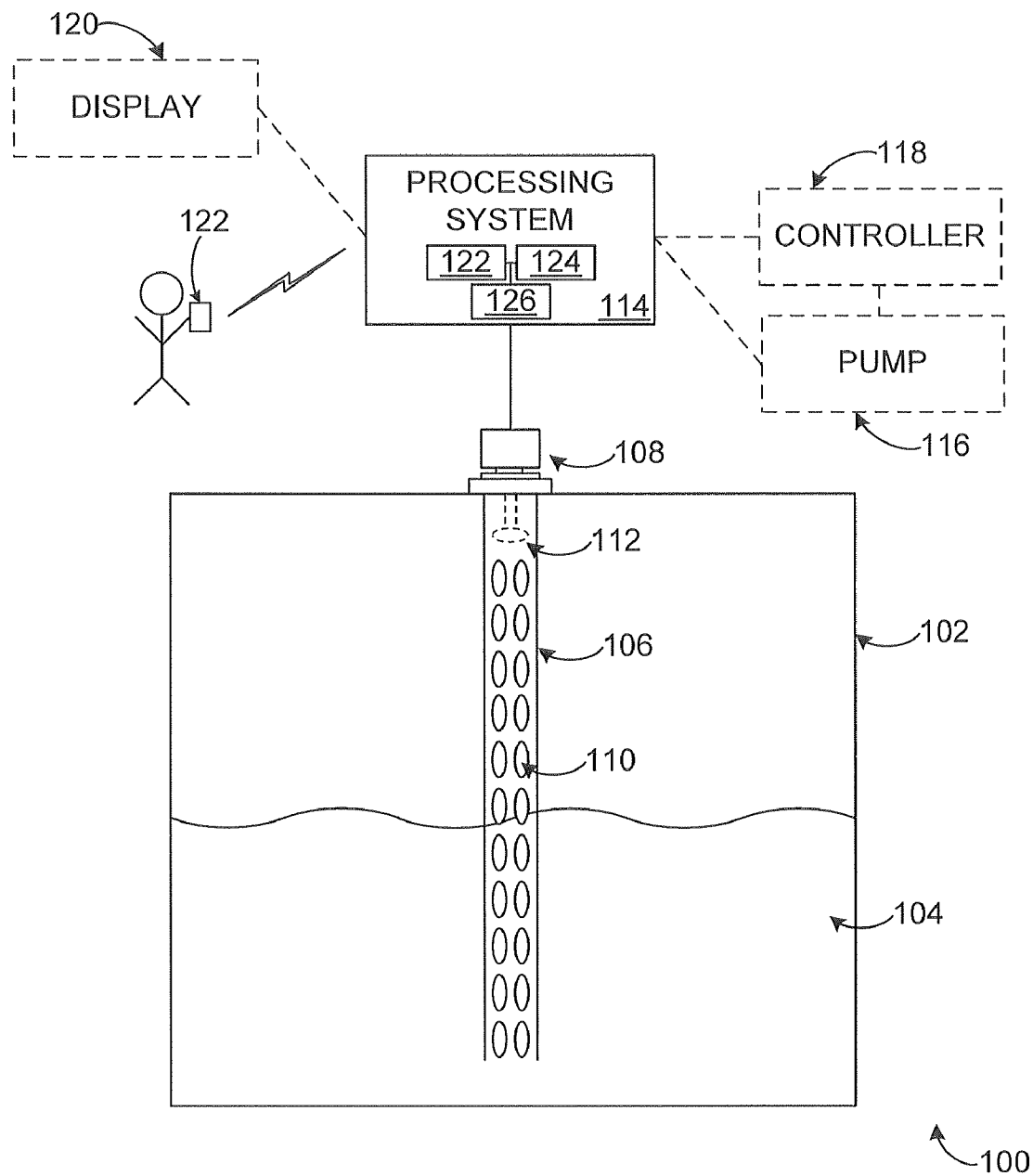
FIG. 1 illustrates an example tank level measurement system according to this disclosure.

FIG. 1 illustrates an example tank level measurement system 100 according to this disclosure. In this example, the system 100 includes a tank 102 that can store one or more materials 104. The tank 102 generally represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

A stillpipe 106 is used in conjunction with a sensor 108 to facilitate the measurement of the level of material 104 in the tank 102. The stillpipe 106 could, for example, be attached or coupled to a top surface of the tank 102. The stillpipe 106 includes various holes, slots, or other openings 110 so that the level of material 104 in the stillpipe 106 is generally equal to the level of the material 104 outside the stillpipe 106 in the tank 102. The stillpipe 106 includes any suitable structure for receiving material and allowing radar or other wireless signals to travel to and from the material. The stillpipe 106 can also be located at any suitable position, such as any position appropriate for the sake of convenience of operation.

The sensor 108 includes at least one antenna 112, which emits electromagnetic waves or other wireless signals towards the material 104 and receives reflected signals from the material 104. The sensor 108 includes any suitable structure for generating signals for wireless transmission and for receiving reflected signals. The antenna 112 includes any suitable structure for transmitting and/or receiving wireless signals, such as a planar or horn antenna.

Data from the sensor 108 is provided to a processing system 114. The processing system 114 can use the data from the sensor 108 in any suitable manner. For example, the sensor 108 could provide data identifying the transmitted and reflected signals, and the processing system 114 can analyze the data to identify the level of the material 104 in the stillpipe 106. The processing system 114 could also use the determined level in any suitable manner. For example, the processing system 114 could control automatic loading or unloading of the tank 102 by controlling a pump 116 or by providing the determined level to an external controller 118 that controls the pump 116. The processing system 114 could also notify personnel responsible for controlling the loading or unloading of the tank 102, such as by displaying the determined level on a display 120 or transmitting the determined level to a wireless or other device 122.

The processing system 114 could represent any suitable computing or processing system or device, such as a computing device, a process controller, or other system or device. In particular embodiments, the processing system 114 includes at least one processor 122 and at least one memory 124 storing instructions and data used, generated, or collected by the at least one processor 122. The processing system 114 can also include at least one interface 126 facilitating communication with external devices or systems like the components 108 and 116-122, such as an Ethernet interface, a radio frequency (RF) or other wireless interface, or a serial interface.

In some embodiments, the processing system 114 implements an algorithm for stillpipe applications (the algorithm could be implemented using any hardware, software, firmware, or combination thereof). The algorithm allows the system 100 to robustly deal with multiple interferences inside stillpipes 106. These interferences can include multiple reflections of multiple modes and can include high-mode effects caused by near-antenna material levels. In particular embodiments, the algorithm may use only three additional steps compared to normal free-space applications.

According to this disclosure, phase velocity is adopted to enhance the algorithm's robustness to interferences resulting from inner diameter variations and large openings 110 of the stillpipe 106. However, the phase velocity varies with the frequencies at which the signals are propagating inside the stillpipe 106, which is called the "waveguide dispersion" phenomenon in microwave literature. Using the stillpipe 106 as a waveguide device generates dispersion effects, which can be dealt with before the signals' phase velocity is used. The following provides example details regarding the computation of the phase velocity and how the phase velocity is used to accurately determine the level of material 104 in the tank 102.

The extent of dispersion may depend on the excited wave mode and the inner diameter of the stillpipe 106. In particular embodiments, the main mode (which is excited by the antenna 112 in the stillpipe 106) can be the TE01 or TE11 mode or a combination of several modes. However, higher modes (such as TE02, TE05, or TE07) can also be generated, and the higher modes can be stacked with TE01 in the near-antenna zone, representing many different reflection peaks.

For a monochromatic wave of frequency $f_k$, the phase velocity $v_p$ of the dispersed wave can be expressed as:

$$v_p = \frac{c}{\sqrt{\mu_r \varepsilon_r \left[1 - \left(\frac{f_c}{f_k}\right)^2\right]}}. \quad (1)$$

Here, $\mu_r$ and $\varepsilon_r$ respectively denote the relative permeability and permittivity of the propagation medium, c denotes the speed of light in free space, and $f_c$ is the cut-off frequency of the stillpipe 106. The cut-off frequency $f_c$ can be defined as:

$$f_c = \frac{c P'_{m,n}}{\pi b \sqrt{\mu_r \varepsilon_r}}. \quad (2)$$

Figure 2:
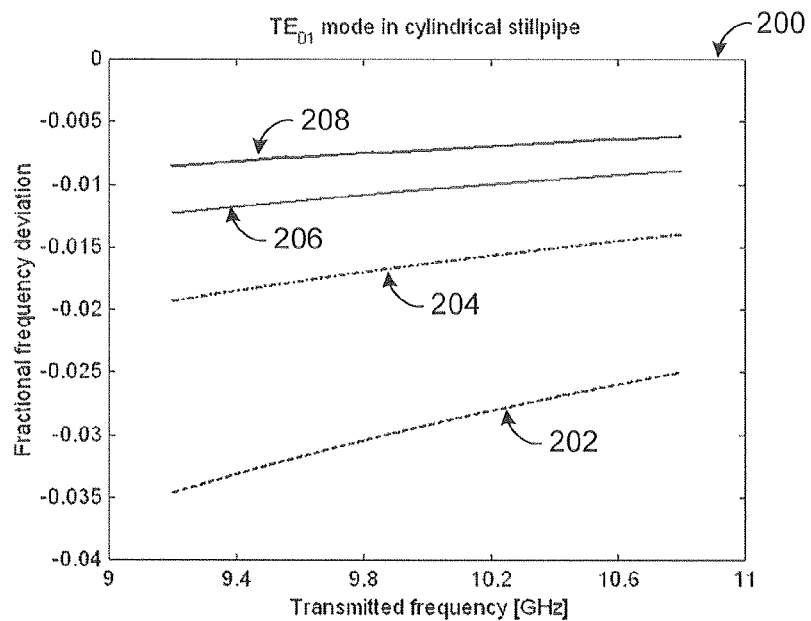
FIG. 2 illustrates an example chart showing dispersion effects experienced during level gauging according to this disclosure.

Here, b denotes the inner diameter of the stillpipe 106, and $P'_{m,n}$ denotes the nth root of its derivative of the mth-order Bessel function of the first kind. For TE01 and TE05, $P'_{m,n}$ equals 3.8317 and 16.4706, respectively. The extent of the dispersion in stillpipes for the TE01 mode may vary with the diameter of the stillpipe, where smaller diameters result in stronger dispersions. This is illustrated in FIG. 2, which gives an example chart 200 showing dispersion effects experienced during level gauging according to this disclosure. In FIG. 2, lines 202-208 represent dispersion effects for a six-inch diameter stillpipe, an eight-inch diameter stillpipe, a ten-inch diameter stillpipe, and a twelve-inch diameter stillpipe, respectively.

In the stillpipe 106 of FIG. 1, for a given target (material 104) at a distance l relative to the phase center of the antenna 112, the distance l can be calculated using phase velocity $v_p$ and the phase-distance relation, which can be expressed as:

$$\varphi_k = \frac{4\pi l f_k}{v_p}. \qquad (3)$$

Substituting $v_p$ from Equation (1), $\phi_k$ can be written as:

$$\varphi_k = \frac{4\pi l f_{dp}^k}{c} \qquad (4)$$

where $f_{dp}^k = \sqrt{\mu_r \epsilon_r (f_k^2 - f_c^2)}$ is equivalent to the kth "dispersed" frequency. Equation (4) mathematically converts a dispersed phase velocity into a non-dispersed phase velocity.

In level gauges, electromagnetic waves can be generated and radiated at linearly-spaced frequency intervals via linearly controlled frequency sweeps. However, the non-linearity of the equation $f_{dp}^k = \sqrt{\mu_r \epsilon_r (f_k^2 - f_c^2)}$ can make dispersed frequencies non-linearly spaced. To solve this, one approach involves using linear interpolation, such as:

$$\hat{y}(n+\eta) = y(n) + \eta[y(n+1) - y(n)]. \qquad (5)$$

Here, $\eta \in [0,1]$ is the fixed fractional delay representing how far the interpolated data point is between y(n) and y(n+1). $\eta$ can be determined by relating the dispersed frequencies to the linearly-spaced frequencies. As a result, the correction of the phase-distance relationship in a stillpipe can be written as:

$$\hat{\varphi}_k = \frac{4\pi l \hat{f}_{dp}^k}{c} \qquad (6)$$

where $\hat{\phi}_k$ denotes the coherent phase at linearly-spaced frequencies $\hat{f}_{dp}^k$ in the stillpipe.

Using this technique, the processing system 114 can calculate a two-way distance from the antenna 112 to the surface of the material 104 from a phase change of radar or other wireless waves propagating inside the stillpipe 106 using phase velocity. The conversion of dispersed phase velocity into normal velocity of the speed of light brings the computation into simpler form, where only a one-time data interpolation may be needed. In other words, no frequency interpolation may be necessary to solve non-linear dispersion effects, making it possible to use a normal phase-distance equation to calculate the distance (a normal phase-distance equation could include multiplying the phase velocity by the phase and dividing the result by two times the angular frequency).

In particular embodiments, one type of antenna 112 can be used for different stillpipes, providing a cost effective solution for customers who have large or varying stillpipe diameters. Also, this technique can be used to break the traditional restraint on mismatch tolerance between antenna diameters and stillpipe inner diameters, meaning greater mismatch can be tolerated. Further, robust immunity to influences from large slots, holes, or other openings 110 on stillpipes and overlapping of the openings 110 on multiple sides of the stillpipes (which can be used in viscous material tanks) can be achieved. In addition, this technique can be applied without additional changes of equipment installations and can relax the stringent requirements on welding parts of stillpipe segments and on the sizes and orientations of openings on the stillpipes.

Note that the "level" of material 104 in a tank 102 could refer to the absolute level of the material 104 in the tank 102, such as when the level represents the distance between the top of the material 104 and the bottom of the tank 102. The "level" could also refer to the relative level of the material 104 in the tank 102, such as when the level represents the distance between the top of the material 104 and the antenna 112.

Although FIG. 1 illustrates an example tank level measurement system 100, various changes may be made to FIG. 1. For example, the system 100 could include any number of tanks 102, stillpipes 106, sensors 108, processing systems 114, and other components. Also, the functional division shown in FIG. 1 is for illustration only. Various components in FIG. 1 could be omitted, combined, or further subdivided and additional components could be added according to particular needs. As a particular example, the processing system 114 could be integrated into (form a part of) the sensor 108. Although FIG. 2 illustrates an example chart 200 showing dispersion effects experienced during level gauging, various changes may be made to FIG. 2. For example, the chart 200 simply illustrates example dispersion effects that could be experienced with stillpipes of different diameters. Other stillpipes having different diameters could be used, and stillpipes with the same or similar diameters and different dispersion effects could be used.

Figure 3:
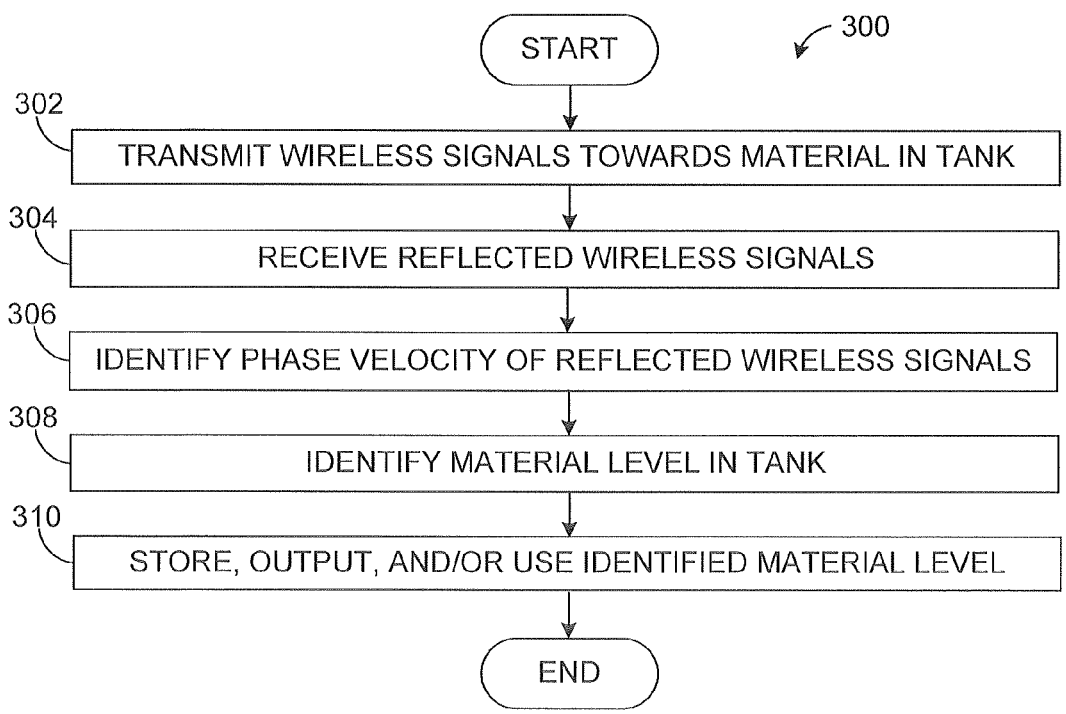
FIG. 3 illustrates an example method for robust level gauging according to this disclosure.

FIG. 3 illustrates an example method 300 for robust level gauging according to this disclosure. As shown in FIG. 3, wireless signals are transmitted towards material in a tank at step 302, and reflected signals are received at step 304. This could include, for example, the sensor 108 generating wireless signals that are transmitted from the antenna 112 through the stillpipe 106 towards the material 104 in the tank 102 and receiving wireless signals reflected from, among other things, the material 104.

A phase velocity is determined for the received wireless signals at step 306. This could include, for example, the processing system 114 using the equations shown above to calculate the coherent phase for the wireless signals actually reflected from the material 104 in the tank 102. The coherent phase can represent the dispersed phase velocity of those wireless signals converted into normal velocity of the speed of light, which can be calculated as shown above using a one-time data interpolation.

The level of material in the tank is identified at step 308. This could include, for example, the processing system 114 using the phase velocity to calculate the distance between the sensor antenna 112 and the material 104 in the tank 102. The identified level is stored, output, and/or used in any suitable manner at step 310. This could include, for example, the processing system 114 displaying the identified level, storing the identified level in a memory, or transmitting messages containing the identified level.

Although FIG. 3 illustrates an example method 300 for robust level gauging, various changes may be made to FIG. 3. For example, while shown as a series of steps, various steps in FIG. 3 may overlap, occur in parallel, or occur multiple times.

Figure 4:
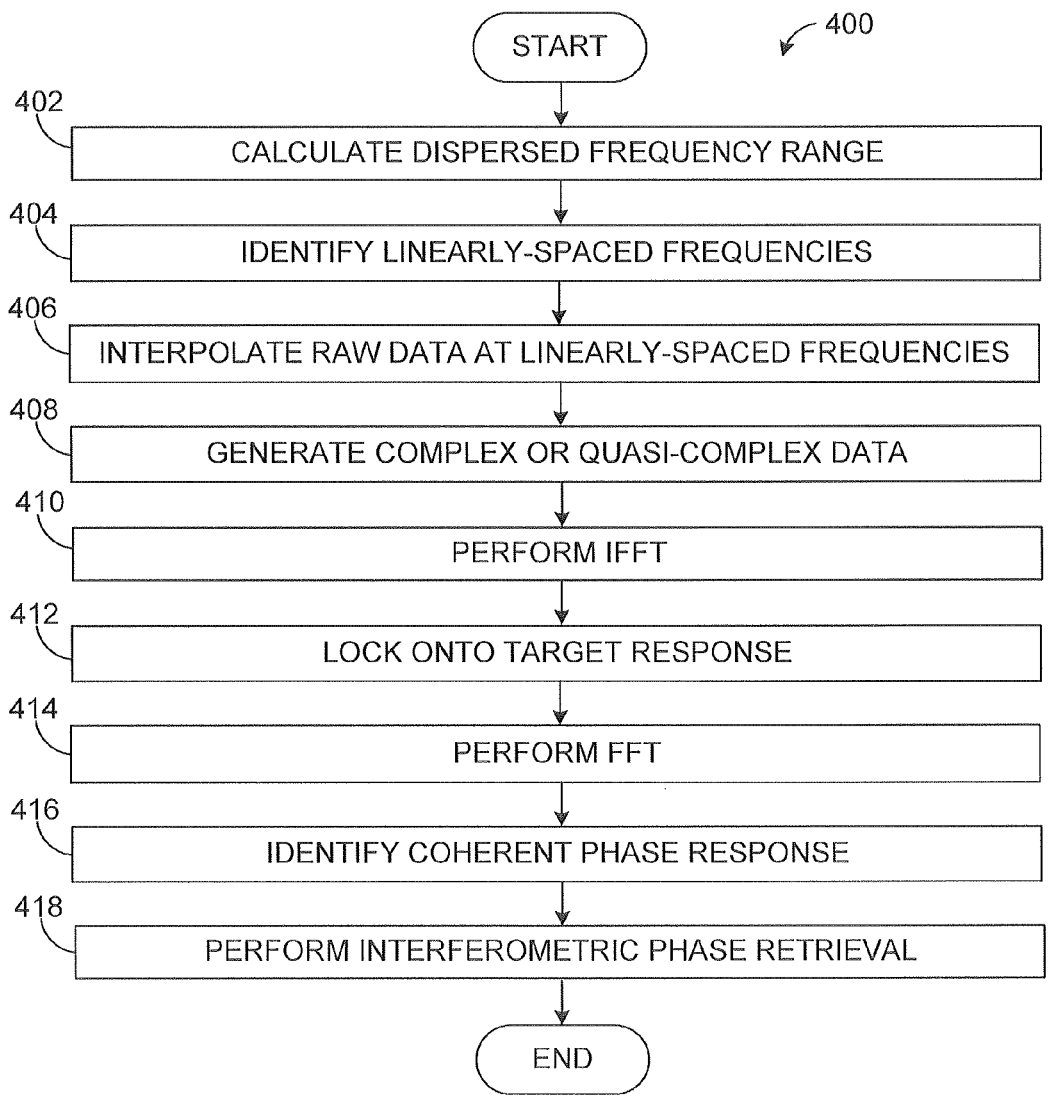
FIG. 4 illustrates an example method for determining a phase velocity of wireless signals according to this disclosure.

FIG. 4 illustrates an example method 400 for determining a phase velocity of wireless signals according to this disclosure. As shown in FIG. 4, a dispersed frequency range of the received wireless signals is calculated at step 402, and linearly-spaced frequencies are identified at step 404. The dispersed frequency range can be calculated in any suitable manner, and the linearly-spaced frequencies can represent any suitable linearly-spaced frequency intervals within the dispersed frequency range.

Raw data is then interpolated between the linearly-spaced frequencies at step 406, and complex or quasi-complex data formation occurs at step 408. The interpolation could be performed as shown above in Equation (5). The complex or quasi-complex data could be generated in any suitable manner. For example, complex data could be generated using hardware having two channels, namely an in-phase (I) channel and a quadrature (Q) channel. Quasi-complex data could be generated using signal processing, such as when a Hebert transform is used to process a single channel of data.

An inverse fast Fourier transform (IFFT) is performed at step 410 to transform the data, and a target response is locked at step 412. The target response represents the signals reflected from a target, which here represents the main-mode signals reflected from the material 104 in the stillpipe 106 (as opposed to signals reflected from openings 110 or other high-mode signals). By means of, for example, a fast Fourier transform (FFT) that occurs at step 414, a coherent phase response is retrieved or determined at step 416. An interferometric phase is retrieved or determined at step 418. The interferometric phase can then be used to determine the level of material 104 in the tank 102 using Equation (6) above.

Note that this technique can provide robust and accurate results in varying situations, such as when the stillpipe 106 has large openings 110 or when the material 104 approaches the antenna 112. This could be true even with large mismatches between the stillpipe diameter and the antenna diameter, such as a mismatch of 25% or more. For example, high modes that the mismatch may generate relative to the main mode TE01 or TE11 can reduce the energy concentration on the main mode and impose their influences on the shape of the main mode reflection, especially when the material 104 moves close to the antenna 112. The multiple modes can interfere with one another, which results in severe degradation of the accuracy and performance stability of conventional techniques. The approach described above can handle this problem properly, providing the ability to extend this technique to extremely large pipes.

Although FIG. 4 illustrates an example method 400 for determining a phase velocity of wireless signals, various changes may be made to FIG. 4. For example, while shown as a series of steps, various steps in FIG. 4 may overlap, occur in parallel, or occur multiple times.

Figure 5:
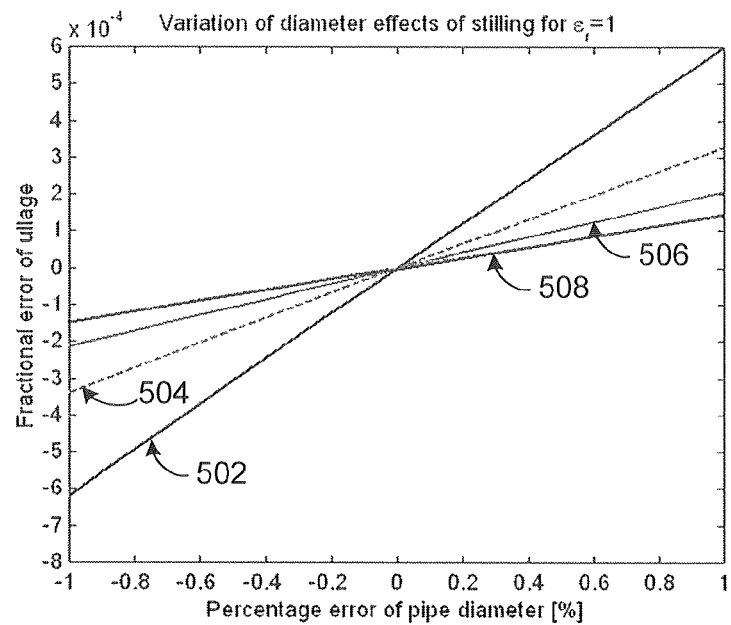
FIGS. 5 through 6B illustrate example error effects in level gauging caused by different dielectric constants (relative permittivity) of vapor space inside a stillpipe according to this disclosure.
Figure 6A:
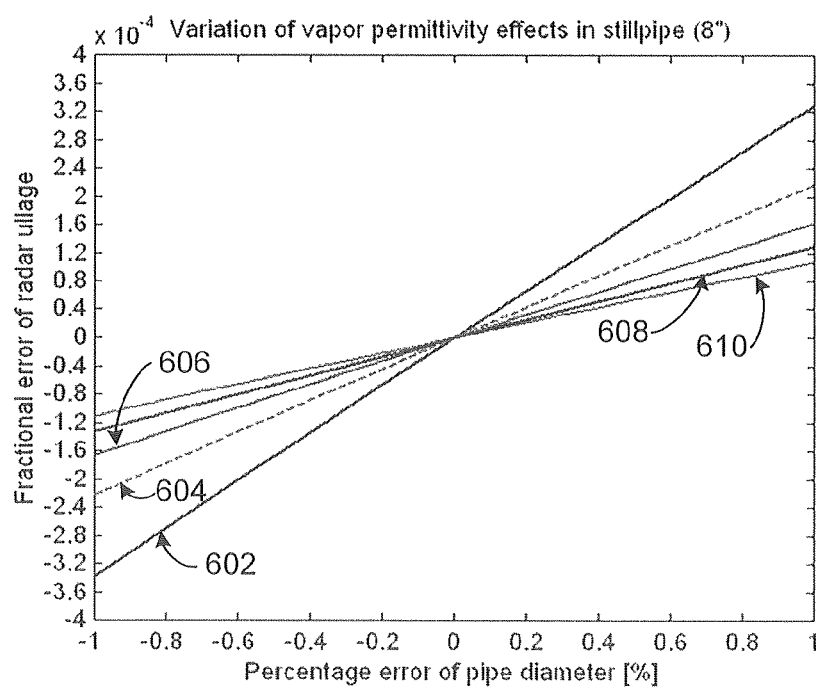
Figure 6B:
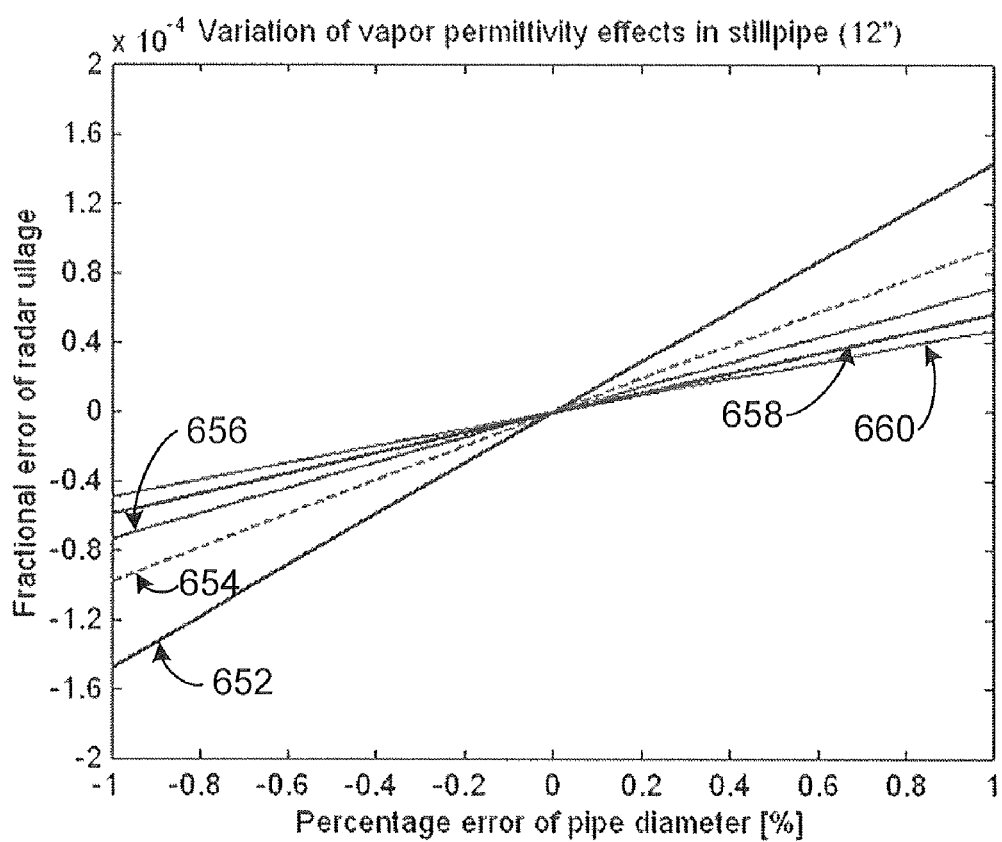

FIGS. 5 through 6B illustrate example error effects in level gauging caused by different dielectric constants (relative permittivity) of vapor space inside a stillpipe according to this disclosure. As noted above, the extent of wave dispersion may depend on the mode, the dielectric constant of the vapor space, and the inner diameter of the stillpipe 106. In some embodiments, a correction can be made based on the inner diameter when calculating the level of material 104 in the tank 102. This may occur, for example, during step 308 in FIG. 3. In other embodiments, the diameter of a stillpipe 106 in a tank 102 may not be measured and/or estimated precisely. Therefore, the sensitivity of ullage error caused by the percentage error of the actual inner diameter of the stillpipe 106 can be evaluated.

FIG. 5 illustrates different sensitivities for different stillpipe diameters according to this disclosure. In FIG. 5, lines 502-508 are associated with different sensitivities for a six-inch diameter stillpipe, an eight-inch diameter stillpipe, a ten-inch diameter stillpipe, and a twelve-inch diameter stillpipe, respectively. As shown here, a 1.5 mm error in diameter estimation may result in an error of 6.6 mm for a 10 m ullage in a six-inch stillpipe and a 0.7 mm error in a twelve-inch stillpipe. The six-inch stillpipe is more sensitive to the precisions of the inner diameter measurement/estimation. As a result, smaller stillpipe diameters are associated with higher sensitivities to error.

Moreover, the permittivity of "gaseous content" in a tank 102 can change if the material in a tank 102 can be vaporized. The gaseous permittivity can also affect the error sensitivity for a given stillpipe 106. FIGS. 6A and 6B illustrate the sensitivity for different permittivities in eight-inch and twelve-inch stillpipes, respectively. In FIG. 6A, lines 602-610 denote the effects of different permittivity values (1.0, 1.5, 2.0, 2.5, and 3.0) in an eight-inch stillpipe. In FIG. 6B, lines 652-660 denote the effects of different permittivity values (1.0, 1.5, 2.0, 2.5, and 3.0) in a twelve-inch stillpipe.

It can be seen that larger relative permittivity values are associated with lower sensitivities to error. This implies that error in diameter estimation has less influence on the level error when the gaseous permittivity becomes bigger. However, the greater gaseous permittivity can result in bigger errors in estimating actual phase velocity, which produces a larger error in the distance calculation. In some embodiments, real-time estimation of vapor permittivity can be used to reduce or eliminate this error. One technique for calibrating a level gauge to current conditions (including current vapor permittivity) to enable more accurate level measurement is disclosed in U.S. patent application Ser. No. 12/119,957, which is hereby incorporated by reference.

The technique described above can robustly deal with multiple interferences inside stillpipes 106. The technique can provide accurate results in adverse conditions. For a given accuracy requirement, the phase velocity-based technique can alleviate stringent requirements on stillpipe diameters and perform better in terms of stability and robustness compared to using group velocity. The conversion of dispersed phase velocity into normal velocity of the speed of light can bring the computation into simpler form such that only one-time data interpolation may be needed (so no frequency interpolation may be necessary). This can reduce the burden placed on processing and memory resources in the level gauge.

In some embodiments, various functions described above are implemented or supported by a computer program that is formed from computer readable program code and that is embodied in a computer readable medium. The phrase "computer readable program code" includes any type of computer code, including source code, object code, executable code, and embedded code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "algorithm" and "program" refers to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an interface configured to receive data identifying wireless signals reflected off material in a tank; and
a processing system configured to calculate a phase velocity of the wireless signals reflected off the material using the data and to identify a level of the material in the tank using the phase velocity wherein the processing system is configured to calculate the phase velocity of the wireless signals by determining a dispersed phase velocity of the wireless signals and converting the dispersed phase velocity into a normal velocity based on a speed of light in a propagation medium.

2. The apparatus of claim 1, wherein the processing system is configured to calculate the phase velocity of the wireless signals by:
identifying a plurality of linearly-spaced frequencies; and
performing linear interpolation using the data identifying the wireless signals to identify data points at the linearly-spaced frequencies.

3. The apparatus of claim 2, wherein the identification of the data points at the linearly-spaced frequencies represents the only interpolation operation performed during the calculation of the phase velocity and the identification of the level of the material.

4. The apparatus of claim 1, further comprising:
a sensor comprising an antenna configured to receive the wireless signals reflected off the material, the sensor configured to generate the data identifying the wireless signals reflected off the material.

5. The apparatus of claim 4, further comprising:
a stillpipe disposed within the tank, wherein the antenna is configured to receive the wireless signals within the stillpipe.

6. An apparatus comprising:
an interface configured to receive data identifying wireless signals reflected off material in a tank;
a processing system configured to calculate a phase velocity of the wireless signals reflected off the material using the data and to identify a level of the material in the tank using the phase velocity;
a sensor comprising an antenna configured to receive the wireless signals reflected off the material, the sensor configured to generate the data identifying the wireless signals reflected off the material; and
a stillpipe disposed within the tank, wherein the antenna is configured to receive the wireless signals within the stillpipe;
wherein an inner diameter of the stillpipe does not equal a diameter of the antenna.

7. The apparatus of claim 6, wherein the diameter of the antenna differs by at least 25% compared to the inner diameter of the stillpipe.

8. A method comprising:
transmitting wireless signals towards a material in a tank;
receiving wireless signals reflected off the material;
calculating a phase velocity of the wireless signals reflected off the material; and
identifying a level of the material in the tank using the phase velocity;
wherein calculating the phase velocity of the wireless signals reflected off the material comprises:
determining a dispersed phase velocity of the wireless signals reflected off the material; and
converting the dispersed phase velocity into a normal velocity based on a speed of light in a propagation medium.

9. The method of claim 8, wherein calculating the phase velocity of the wireless signals comprises:
identifying a plurality of linearly-spaced frequencies; and
performing linear interpolation using the data identifying the wireless signals to identify data points at the linearly-spaced frequencies.

10. The method of claim 9, wherein the identification of the data points at the linearly-spaced frequencies represents the only interpolation operation performed during the calculation of the phase velocity and the identification of the level of the material.

11. The method of claim 8, wherein:
transmitting the wireless signals towards the material comprises transmitting the wireless signals through a stillpipe; and
receiving the wireless signals reflected off the material comprises receiving the wireless signals at an antenna disposed within the stillpipe.

12. A method comprising:
transmitting wireless signals towards a material in a tank;
receiving wireless signals reflected off the material;
calculating a phase velocity of the wireless signals reflected off the material; and
identifying a level of the material in the tank using the phase velocity;
wherein transmitting the wireless signals towards the material comprises transmitting the wireless signals through a stillpipe;
wherein receiving the wireless signals reflected off the material comprises receiving the wireless signals at an antenna disposed within the stillpipe; and
wherein an inner diameter of the stillpipe differs by at least 25% compared to a diameter of the antenna.

13. The method of claim 8, further comprising at least one of:
- displaying the identified level of the material;
- transmitting the identified level of the material; and
- storing the identified level of the material.

14. The method of claim 8, further comprising:
controlling a pump that loads the material into the tank or unloads the material from the tank using the identified level of the material.

15. A non-transitory computer readable medium embodying a computer program, the computer program comprising computer readable program code that when executed causes at least one data processing system to perform the steps of:
- receiving data identifying wireless signals reflected off material in a tank;
- calculating a phase velocity of the wireless signals reflected off the material using the data; and
- identifying a level of the material in the tank using the phase velocity;
- wherein the computer readable program code that causes the at least one data processing system to calculate the phase velocity of the wireless signals comprises computer readable program code that when executed causes the at least one data processing system to perform the steps of:
  - determining a dispersed phase velocity of the wireless signals; and
  - converting the dispersed phase velocity into a normal velocity based on a speed of light in a propagation medium.

16. The non-transitory computer readable medium of claim 15, wherein the computer readable program code that causes the at least one data processing system to calculate the phase velocity of the wireless signals comprises computer readable program code that when executed causes the at least one data processing system to perform the steps of:
- identifying a plurality of linearly-spaced frequencies; and
- performing linear interpolation using the data identifying the wireless signals to identify data points at the linearly-spaced frequencies.

17. The non-transitory computer readable medium of claim 16, wherein the identification of the data points at the linearly-spaced frequencies represents the only interpolation operation performed during the calculation of the phase velocity and the identification of the level of the material.

* * * * *